Jan. 12, 1932.   R. N. HUNTER ET AL   1,840,362
TRANSPOSITION BRACKET FOR INSULATORS
Filed June 23, 1930

INVENTORS
R. N. Hunter and H. F. Stover
BY
ATTORNEY

Patented Jan. 12, 1932

1,840,362

UNITED STATES PATENT OFFICE

RUSSELL N. HUNTER, OF WESTFIELD, NEW JERSEY, AND HERBERT F. STOVER, OF BROOKLYN, NEW YORK, ASSIGNORS TO AMERICAN TELEPHONE AND TELEGRAPH COMPANY, A CORPORATION OF NEW YORK

TRANSPOSITION BRACKET FOR INSULATORS

Application filed June 23, 1930. Serial No. 463,272.

This invention relates to brackets, and more particularly to transposition brackets adapted for use in connection with electric transmission lines.

In the construction of electric transmission lines, and particularly telephone lines, the pairs of conductors comprising such lines are transposed at suitable intervals in accordance with well known practice to equalize induction effects between the conductors. As is generally known these conductors are carried by insulators mounted on pins which fit in holes bored at definite intervals from each other in crossarms. The definite spacing of the holes in turn causes a definite spacing of the conductors carried by the insulators. It is important that this definite spacing of the conductors be maintained throughout the length of the line. When corners or angles are encountered, or when it is required that the conductors be changed from a supported position on the insulators toward the poles to a position on the side of the insulators away from the poles, difficulty has been met in the transposition of the conductors to maintain a uniform spacing between them.

Accordingly, it is one of the objects of this invention to provide a bracket for transposing electric transmission conductors at suitable intervals to equalize induction effects between the conductors.

Another object is to provide such bracket with integral parts so related as to insure substantially accurate and uniform spacing of the conductors throughout the length of the line.

A further object of the invention is to provide a bracket of this character which is comparatively simple and inexpensive.

These and further objects will be apparent from the following description, when considered in connection with the accompanying drawings in which a preferred embodiment of the invention is illustrated.

Figure 2:
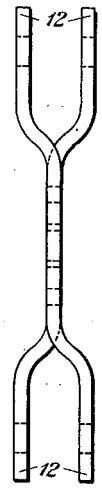
Figure 1:
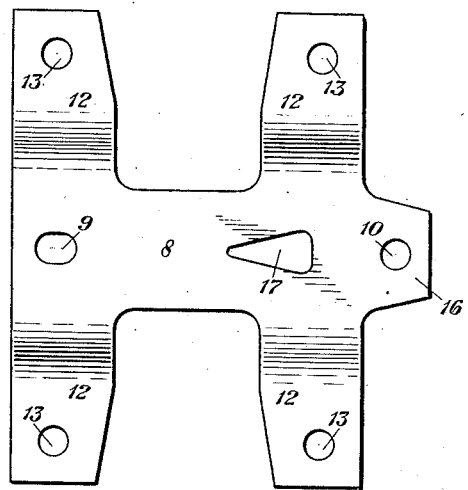
Figure 3:
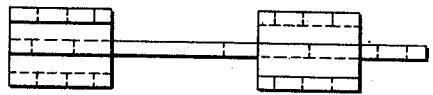
Figure 4:
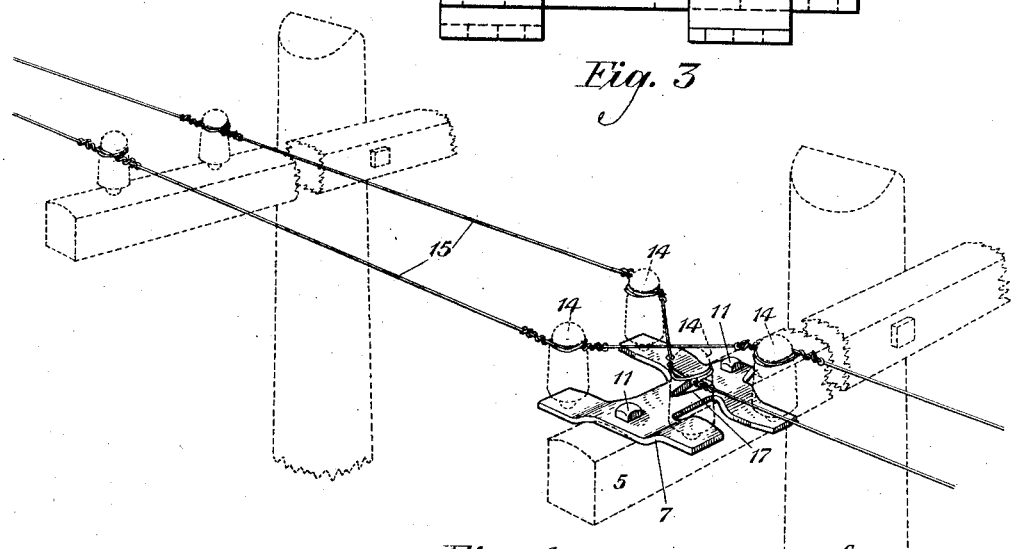

Referring to the drawings, Figure 1 is a plan view of the improved arrangement; Fig. 2 is a side view thereof; Fig. 3 is an end view of Fig. 1; and Fig. 4 is a perspective view of the improved bracket shown applied as in practice to the crossarm of a pole.

The preferred embodiment of the invention comprises a bracket particularly adapted for use with "high grade circuits" which require the utmost care in their installation to reduce induction effects between the conductors. The brackets may be made of any suitable material, such as high carbon steel, or the like. These brackets are provided at suitable intervals along the transmission line and are mounted on crossarms 5 carried by poles 6.

The bracket 7 is of substantially H-shaped formation and its central portion 8 is substantially flat. The central portion lies on the crossarm 5 in a horizontal position and is provided with openings 9 and 10. The bracket is affixed to the crossarm by bolts 11 which extend through these openings into holes prepared in the crossarm. The opening 9 in the bracket is made somewhat oval in shape so it may make proper registration with the holes in crossarms should they be caused to vary slightly from their original position in the crossarm on account of shrinkage of the latter, or from manufacturing variations in the bracket or the crossarms.

A pair of parallel arms or side bars 12 extend from each side of the flat portion 8 of the bracket, and each arm is provided near its extremity with an opening 13. These openings are provided for the reception of steel pins on which the insulators 14 that carry the line conductors, are mounted. The ends of the arms or side bars are in an offset plane with respect to the flat portion 8. The ends of the pair of adjacent arms extending from one side of the portion 8 are on different levels with respect to each other, and the ends of the arms on diametrically opposite sides of the portion 8 are substantially on the same level. The arrangement of the arms as described permits the line conductors to be crossed over each other in different planes to diametrically opposite insulators, as indicated in Fig. 4. The ends of the arms 12 may be cut away to lessen the weight of the bracket.

The bracket is provided with a lug 16 which extends outwardly from one side of the central portion 8. This lug in which the opening 10 is provided, permits the bracket to maintain a definite and consistent spacing between the line conductors throughout. The distance between the centers of the opening 9 and the opening 10 is the same as the distance between the centers of the holes in the crossarms, and is substantially equal to the normal spacing between a pair of conductors extending along a pole line. The distance between the centers of the openings 13 in the adjacent arms 12 is less than the distance between the centers of the holes in the crossarms. This variance in distance is substantially the diameter of a groove of an insulator.

The bracket may be reversibly positioned on a crossarm and the triangular opening 17 or indicating means in the central portion of the bracket is for the purpose of orientating or directioning the bracket on the crossarm. In the installation of the bracket on the crossarm, the apex of the triangular hole should point in the direction the conductors are positioned on the insulators of non-transposed pairs of conductors on the same side of the pole. That is, if the conductors of the non-transposed pair are tied on the outside of the insulators or away from the pole, the apex of the triangular hole should point outwardly or away from the pole. If the conductors are tied on the inside of the insulator or toward the pole, the apex of the triangular hole should point inwardly. By so pointing the apex of the triangular hole, the proper positioning of the bracket on the crossarm to maintain substantially uniform spacing of the conductors of the line is assured.

It will be apparent from the above that the transposition of the conductors of a transmission line by means of this improved integral bracket takes place and is completed at one point or pole, in contradistinction to previous methods, in which several points or poles were required to complete the transposition.

What is claimed is:

1. A transposition bracket for insulators adapted to be attached to a crossarm, said bracket having arms extending horizontally, insulators supported at the extremities thereof, the extremities of adjacent arms being at different levels, one point of attachment of the bracket being substantially in alinement with the centers of the insulators on one arm of the bracket, and another point of attachment being in offset relation to the insulators on the other arm of the bracket.

2. A transposition bracket adapted to be attached to a crossarm, said bracket including a pair of parallel plates connected by a central member, the opposite ends of each plate being at different levels, an insulator mounted at each end of said plates, said central member providing two points of attachment to the crossarm, one point of attachment of the bracket being in alinement with the mounted insulators on one of the parallel plates and the other point of attachment being in offset relation to the insulators carried by the other parallel plate.

3. A transposition bracket of substantially H-shaped formation, an insulator mounted on the ends of said bracket, line wires carried by the insulators, the central portion of said bracket being adapted for attachment to a crossarm, and having openings for attaching means spaced apart a distance equal to the normal spacing of the line wires of a pole line, the adjacent ends of the side bars of the H being in different parallel planes, and the distance between the insulators of the two side bars of the H being less than the distance between the openings in the central portion of the H by an amount substantially equal to the diameter of the groove of an insulator.

In testimony whereof, we have signed our names to this specification this 20th day of June, 1930.

RUSSELL N. HUNTER.
HERBERT F. STOVER.